(12) United States Patent
Plettner et al.

(10) Patent No.: US 9,840,124 B2
(45) Date of Patent: Dec. 12, 2017

(54) ELECTRONIC CONTROL SYSTEM FOR A MOTOR VEHICLE

(71) Applicant: Schaeffler Technologies AG & Co. KG, Herzogenaurach (DE)

(72) Inventors: Georg Plettner, Nuremberg (DE); Simon Sagewka, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/031,099

(22) PCT Filed: Aug. 12, 2014

(86) PCT No.: PCT/DE2014/200396
§ 371 (c)(1),
(2) Date: Apr. 21, 2016

(87) PCT Pub. No.: WO2015/058748
PCT Pub. Date: Apr. 30, 2015

(65) Prior Publication Data
US 2016/0311285 A1  Oct. 27, 2016

(30) Foreign Application Priority Data

Oct. 21, 2013  (DE) .......... 10 2013 221 248

(51) Int. Cl.
*B60G 17/00*  (2006.01)
*B60R 16/02*  (2006.01)
(Continued)

(52) U.S. Cl.
CPC ......... *B60G 17/016* (2013.01); *B60G 17/017* (2013.01); *B60G 17/018* (2013.01); *B60G 21/055* (2013.01); *B60R 16/0231* (2013.01); *B60G 2204/11* (2013.01); *B60G 2400/71* (2013.01); *B60G 2400/712* (2013.01);
(Continued)

(58) Field of Classification Search
CPC .......... B60W 10/06; B60W 2050/0006; B60R 16/0315
See application file for complete search history.

(56) References Cited

U.S. PATENT DOCUMENTS

| 5,521,588 A | 5/1996 | Kuhner et al. |
| 2005/0056502 A1 | 3/2005 | Maes |

(Continued)

FOREIGN PATENT DOCUMENTS

| DE | 4315494 | 9/1994 |
| DE | 102010040977 | 3/2012 |

(Continued)

*Primary Examiner* — Thomas Ingram
(74) *Attorney, Agent, or Firm* — Volpe and Koenig, P.C.

(57) ABSTRACT

The present invention relates to an electronic control system for a motor vehicle, including a control device, an actuator, and at least one sensor. The control system according to the invention is characterized in that it has a sensor board for reading the data detected by the sensor, wherein the sensor board has a memory for storing actuator-specific data and an interface between the sensor board and the control device for transferring the data stored in the sensor board to the control device. The present invention also relates to a method for operating this type of control system.

10 Claims, 2 Drawing Sheets

(51) Int. Cl.
*B60G 21/05* (2006.01)
*B60G 17/016* (2006.01)
*B60G 17/017* (2006.01)
*B60G 17/018* (2006.01)
*B60G 21/055* (2006.01)
*B60R 16/023* (2006.01)

(52) U.S. Cl.
CPC ...... *B60G 2400/98* (2013.01); *B60G 2600/70* (2013.01); *B60G 2600/704* (2013.01); *B60G 2600/71* (2013.01); *B60G 2800/87* (2013.01)

(56) References Cited

U.S. PATENT DOCUMENTS

| | | | |
|---|---|---|---|
| 2005/0273210 A1* | 12/2005 | Pfaffeneder | B60R 16/0315 701/1 |
| 2006/0190155 A1* | 8/2006 | Meyer | B60W 50/0098 701/54 |
| 2008/0221752 A1 | 9/2008 | Jager et al. | |
| 2011/0301820 A1* | 12/2011 | Mullner | G07C 5/00 701/67 |
| 2013/0204493 A1* | 8/2013 | Ricci | G06F 17/00 701/41 |
| 2013/0218411 A1 | 8/2013 | Drewes | |

FOREIGN PATENT DOCUMENTS

| | | |
|---|---|---|
| EP | 1219867 | 7/2002 |
| EP | 1362721 | 11/2003 |
| EP | 1529956 | 5/2005 |
| EP | 1967435 | 9/2008 |
| WO | 2005113307 | 12/2005 |

\* cited by examiner

ELECTRONIC CONTROL SYSTEM FOR A MOTOR VEHICLE

BACKGROUND

The present invention relates to an electronic control system for a motor vehicle, comprising a controller, an actuator and at least one sensor. The control system can be used, for example, for roll stabilization of motor vehicles.

Roll stabilization, that is to say a reduction in the rotational vehicle movements about the vehicle longitudinal axis, results in a significant improvement in handling and driving comfort. EP 1 362 721 B1 describes an electronic control system for a motor vehicle having a roll stabilization apparatus in the form of divided stabilizers which are each associated with a vehicle axle and of which the stabilizer halves can be rotated in relation to one another by means of an actuating motor in each case. The actuating motors are actuated by the control system, taking into account the lateral acceleration and the driving speed and also the steering angle of the motor vehicle. Each actuating motor has an associated power electronics system comprising a low-level controller and a low-level monitoring logic system, which power electronics system is connected to a central controller by a data bus. The central controller performs superordinate control and divides the stabilization moment, which is required for roll stabilization, between the front and the rear axle of the vehicle.

Controllers are used in many areas of motor vehicle control. They generally operate in accordance with an input-processing-output (IPO) principle. Sensors are provided for input. These sensors determine a physical characteristic variable, such as rotation speed, pressure, temperature etc. for example. This value is compared with a target variable which is input into or calculated in the controller. If the measured value does not correspond to the stored value, the controller adjusts the physical process by actuators, so that the measured actual values again correspond to the setpoint variables. Therefore, the actuators intervene in an ongoing process so as to correct it.

So-called remotely mounted controllers are arranged in the areas of the vehicle in which they are subject to low levels of loading owing to the environmental conditions. This produces a physical separation between the remotely mounted controller and sensors or actuators, this resulting in relatively long data transmission paths which are naturally susceptible to faults. In conventional actuators, the controller, for example when detachably connected to the actuator by means of a plug, cannot independently determine whether the actuator has been replaced or whether a new controller has been trained. As a result of this, incorrect installation in the case of detachable connections between the controller and the actuator cannot be effectively prevented. In the case of systems which do not use releasable connections, such as single-use plugs or welded connections, incorrect installation of the controller and the actuator can be precluded, but the systems have the disadvantage that only the entire unit comprising actuator and controller can be replaced. Separate replacement of only one of the two components is not possible. If actuator-specific data has to be stored in the controller, this actuator-specific data being required for control purposes for example, said actuator-specific data has to be received during actuator production and stored in the controller at the latest during pairing of the control device and the actuator.

SUMMARY

The object of the present invention is to provide an electronic control system for a motor vehicle which allows unambiguous identification of an actuator, reliably identifies incorrect installation of the controller and the actuator, and therefore allows reliable component replacement of the controller and/or the actuator. A further objective is to provide a method for operating a control system of this kind.

This object is achieved by an electronic control system.

The electronic control system according to the invention comprises a controller, an actuator, at least one sensor and a sensor board. The controller is preferably designed as a remotely mounted controller, that is to say there is a physical separation between the controller and the sensor or actuator. The sensor board is used to read the data which is detected by the sensor. Furthermore, actuator-specific data is stored in a memory of the sensor board. There is a corresponding interface between the sensor board and the controller for transmitting the data which is stored in the sensor board to the controller.

A significant advantage of the control system according to the invention is that the data which is detected by the sensors can be centrally read by using a sensor board, and then can be transmitted to the controller by a common data line in bundled form. By virtue of appropriate arrangement of the sensor board, supply line lengths can be reduced, this not least also increasing the reliability of the overall system. The sensor board is preferably located physically separately between the controller and the actuator. Since actuator-specific data can be stored in the memory of the sensor board, the actuator can be unambiguously identified by the controller. The actuator-specific data can be stored in the sensor board in an end-of-line (EOL) manner, that is to say, at the end of line production. The actuator-specific data includes, for example, variant, serial number, calibration data, sensor offset and actuator stiffness characteristic. The actuator-specific data can be transmitted from the sensor board to the controller in the vehicle. Up until now, it has been necessary to store data of this kind in the controller at the latest during pairing of the controller and the actuator. In the control system according to the invention, separate component replacement of the controller and/or the actuator is possible at any time since incorrect installation can be reliably identified. Variant coding can be performed by the sensor board and no longer has to be carried out during production, as has been the case up until now.

According to a preferred embodiment, at least one sensor is arranged on the sensor board. Since, amongst other things, supply lines can be saved in this way, the direct arrangement of sensors on the sensor board is preferred, provided that this is geometrically possible.

The control system preferably comprises sensors for detecting the temperature, the rotor position and/or the torque.

According to an advantageous embodiment, the actuator is an electric motor.

The electronic control system according to the invention can be designed for roll stabilization of the motor vehicle.

The object is also achieved by a method.

The method comprises the steps described below: first, the controller is started. The actuator-specific data which is stored in the sensor board is transmitted to the controller. The actuator-specific data which is transmitted from the sensor board is compared with actuator-specific data which is stored in the controller. The controller is switched to the normal operating mode when the data which is transmitted from the sensor board corresponds to the data which is stored in the controller. Sensor data is read by the sensor board and transmitted to the controller in the normal operating mode. The controller evaluates the sensor data and, if required, outputs corresponding control instructions to the actuator in order to control the process in question. A training process is started if the data which is transmitted from the sensor board does not correspond to the data which is stored in the controller. Within the scope of this training process, the actuator-specific data which is transmitted from the sensor board is stored in the controller. The controller is configured in accordance with the actuator-specific data which is transmitted from the sensor board. The controller then switches to the normal operating mode.

The method according to the invention has the major advantage that the actuator is always identified after the controller is started. To this end, the actuator-specific data is transmitted from the sensor board to the controller and evaluated by the controller. Within the scope of the identification process, a check is made in respect of whether the controller and the actuator have already "interacted". If this is the case, the actuator-specific data is stored in the controller. The controller "knows" the actuator and can be immediately switched to the normal operating mode. If the actuator and controller are being paired for the first time, the controller does not yet "know" the actuator, that is to say the actuator-specific data is not yet stored in the memory of the controller. In this case, the controller automatically starts a training process. As a result of this training process, the actuator-specific data is contained in the memory of the controller and the controller is correspondingly configured. The controller now "knows" the actuator and can be switched to its normal operating mode. Since the identity of the actuator is checked each time the controller is restarted, component replacement of the actuator or the controller is possible at any time. Up until now, actuator-specific data has had to be stored in the controller at the latest during pairing of the controller and the actuator. In the case of detachable connections between the actuator and the controller, it has not been possible to effectively prevent incorrect installation with the previous solutions.

According to a preferred embodiment, data is transmitted between the sensor board and the controller by a field bus, for example by CAN bus or FlexRay bus. High-frequency and robust sensor signal transmission is made possible by selecting an established protocol-based manner of transmission of this kind. The controller and the actuator likewise preferably communicate by a field bus.

BRIEF DESCRIPTION OF THE DRAWINGS

Preferred embodiments of the invention will be explained in greater detail below with reference to the figures, in which.

DETAILED DESCRIPTION OF THE PREFERRED EMBODIMENTS

Figure 1:
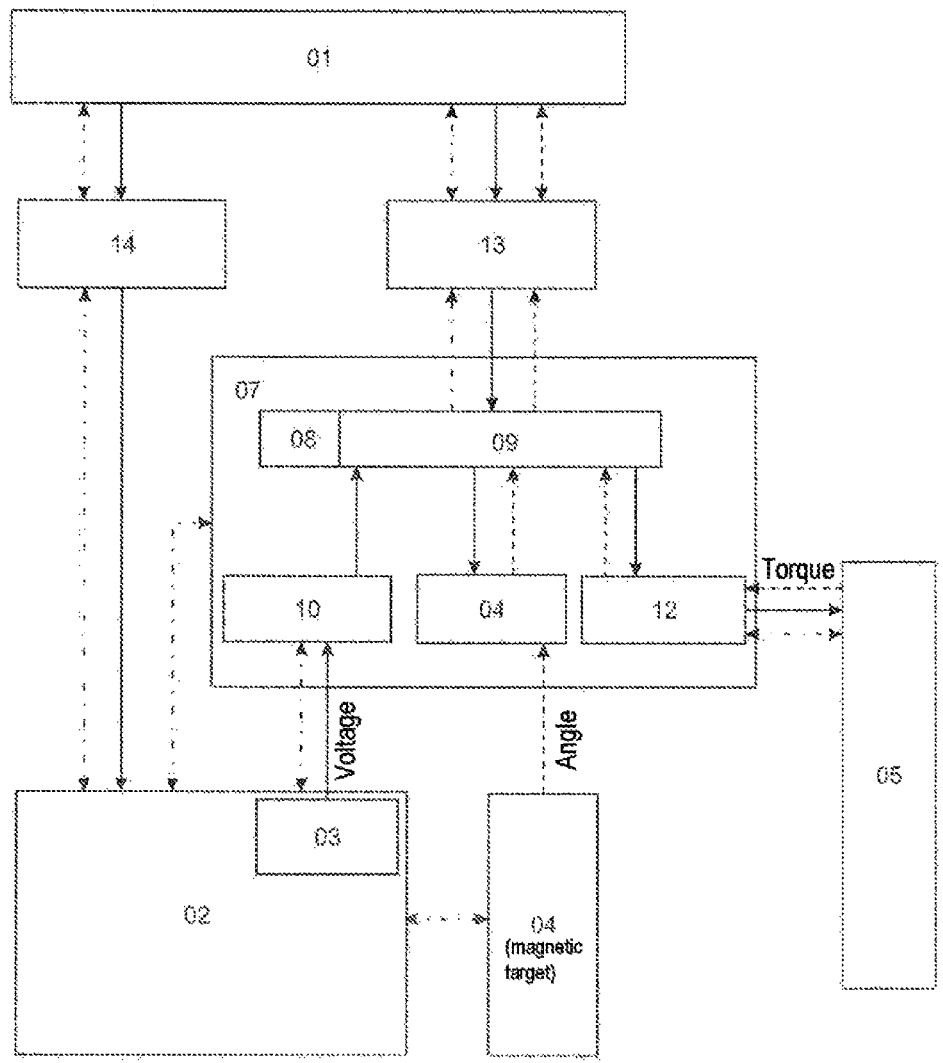
FIG. 1 shows a schematic view of an electronic control system according to the invention.

The electronic control system according to the invention comprises a controller 01 which is preferably designed as a remotely mounted controller. The controller 01 is connected to an actuator 02. The controller 01 and the actuator 02 are installed such that they are physically separated from one another. In typical applications, the distance between the controller 01 and the actuator 02 is approximately 1 to 1.5 meters. The control system further comprises a plurality of sensors, specifically a temperature sensor 03, a rotor position sensor 04 and a torque sensor 05.

A sensor board 07 is located between the actuator 02 and the controller 01. The sensor board 07 comprises a non-volatile memory 08 in which actuator-specific data, such as variant, serial number, calibration data, sensor offset and actuator stiffness characteristic, are stored. This data is determined during assembly of the vehicle and is stored in the sensor board 07. The sensor board 07 and the actuator 02 are preferably mechanically connected to one another. The sensor board 07 also has a logic unit 09 for reading the sensor signals. In the shown embodiment of the control system, the rotor position sensor 04 is arranged on the sensor board 07. The temperature sensor 03 is arranged on the actuator 02 and is connected to a corresponding temperature sensor contact 10 of the sensor board 07. The torque sensor 05 is connected to a torque sensor contact 12 of the sensor board 07. The sensor data which is read by the logic unit 09 is transmitted to the controller 01 via an interface 13 by a field bus. The actuator-specific data which is stored in the memory 08 of the sensor board 07 can be called up by the controller 01.

The sensor data which is to be transmitted is illustrated using dashed lines in FIG. 1. It is clear that the sensor data which is read by the logic unit 09 is transmitted to the controller 01 in bundled form. The electrical lines are illustrated as solid lines and the mechanical connections are illustrated as dash-and-dot lines. The controller 01 communicates with the actuator 02 via a corresponding interface 14.

Figure 2:
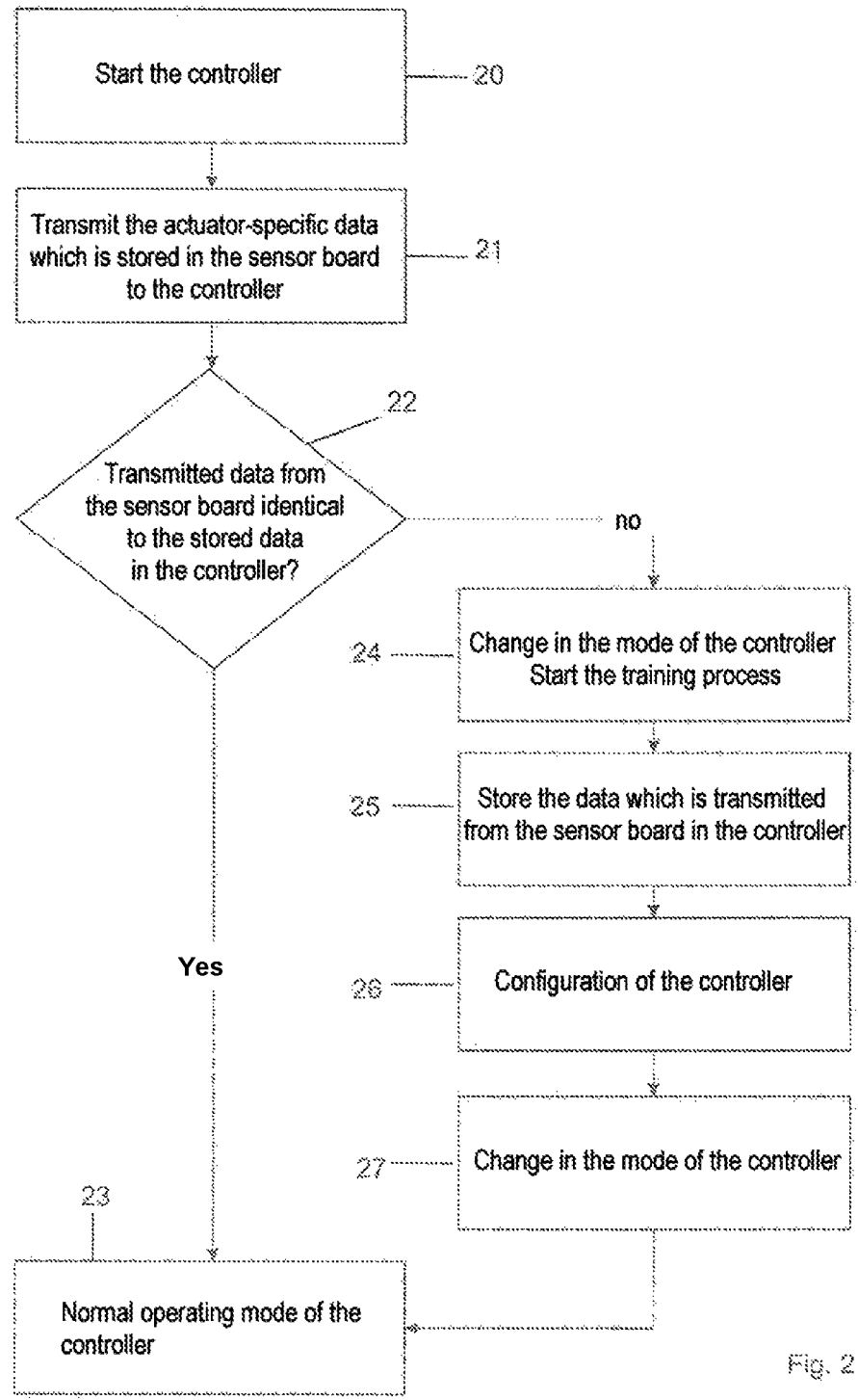
FIG. 2 shows a flowchart of a method according to the invention.

The method according to the invention for operating the electronic control system will be explained below with reference to the flowchart shown in FIG. 2. In a first step 20, the controller 01 is started. Then, in step 21, the actuator-specific data which is stored in the sensor board 07 is transmitted to the controller 01. This is followed in the third step 22 by comparison of the actuator-specific data which is transmitted from the sensor board 07 with the actuator-specific data which is already stored in the controller 01. If the data corresponds, the actuator 02 is already known to the controller 01. Therefore, in step 23, the controller can be switched to the normal operating mode. If the data does not correspond, the mode of the controller 01 is changed in step 24. A training process is started. The actuator-specific data which is transmitted from the sensor board 07 is stored in the controller 01 in step 25 for this purpose. Furthermore, in step 26, the controller 01 is configured in accordance with the actuator-specific data which is transmitted from the sensor board 07. The mode of the controller 01 is then changed in step 27. The controller 01 is subsequently switched to the normal operating mode (step 23). During the normal operating mode, the sensor data which is read by the sensor board 07 is transmitted from the sensor board 07 to the controller 01 by a field bus. The controller 01 evaluates the transmitted sensor data and, if control of the process in question is required, sends corresponding control instructions to the actuator 02.

LIST OF REFERENCE SYMBOLS

01 Controller
02 Actuator
03 Temperature sensor
04 Rotor position sensor
05 Torque sensor
06 -
07 Sensor board
08 Memory 09 Logic unit
10 Temperature sensor contact
11 -
12 Torque sensor contact
13 Sensor board/controller interface
14 Actuator/controller interface
20-27 Method steps

The invention claimed is:

1. A method for operating an electronic control system having:
   a controller, an actuator and at least one sensor
   a sensor board for reading data which is detected by the sensor, the sensor board has a memory for storing actuator-specific data and
   an interface between the sensor board and the controller for transmitting the data which is stored in the sensor board to the controller, wherein said method comprising comprises:
   starting the controller;
   transmitting the actuator-specific data which is stored in the sensor board to the controller;
   comparing the actuator-specific data which is transmitted from the sensor board with actuator-specific data which is stored in the controller;
   switching the controller to a normal operating mode when the actuator-specific data which is transmitted from the sensor board corresponds to the actuator-specific data which is stored in the controller;
   starting a training process when the actuator-specific data which is transmitted from the sensor board does not correspond to the actuator-specific data which is stored in the controller, said training method comprising the following sub-steps:
   storing the actuator-specific data which is transmitted from the sensor board in the controller;
   configuring the controller in accordance with the actuator-specific data which is transmitted from the sensor board; and
   switching to the normal operating mode of the controller.

2. The method as claimed in claim 1, wherein sensor data is read from the sensor board and transmitted to the controller in the normal operating mode of the controller.

3. The method as claimed in claim 1, further comprising performing data transmission between the sensor board and the controller by a field bus.

4. An electronic control system for a motor vehicle, comprising: —a controller, an actuator and at least one sensor; —a sensor board for reading data which is detected by the sensor, the sensor board has a memory for storing actuator-specific data; and —an interface between the sensor board and the controller for transmitting the data which is stored in the sensor board to the controller, wherein the controller compares the actuator-specific data which is transmitted from the sensor board with actuator-specific data which is stored in the controller and starts a training process when the actuator-specific data which is transmitted from the sensor board does not correspond to the actuator-specific data which is stored in the controller, and wherein the training process includes configuring the controller in accordance with the actuator-specific data which is transmitted from the sensor board.

5. The electronic control system as claimed in claim 4, wherein the sensor board is physically arranged between the controller and the actuator, and the sensor board is connected to the actuator.

6. The electronic control system as claimed in claim 4, wherein the at least one sensor is arranged on the sensor board.

7. The electronic control system as claimed in claim 4, wherein the at least one sensor comprises sensors for detecting the temperature, the rotor position or the torque.

8. The electronic control system as claimed in claim 4, wherein the controller is a remotely mounted controller which is arranged physically separately from the actuator in the motor vehicle.

9. The electronic control system as claimed in claim 4, wherein the actuator is an electric motor.

10. The electronic control system as claimed in claim 4, wherein the electronic control system is a roll stabilization system of the motor vehicle.

* * * * *